US007574304B2

(12) United States Patent
Jackway et al.

(10) Patent No.: US 7,574,304 B2
(45) Date of Patent: Aug. 11, 2009

(54) CHROMATIN SEGMENTATION

(75) Inventors: Paul Jackway, Toowong (AU); Andrew Mehnert, St. Lucia (AU)

(73) Assignees: University of Adelaide, Mawson Lakes (AU); University of South Australia, North Terrace (AU); University of Melbourne, Parkville (AU); Flinders University School of Informatics and Engineering, Bedford Park (AU); The University of Queensland, St. Lucia (AU); The Commonwealth of Australia (Defense Science & Technology Organisation), Salisbury (AU); Telstra Corporation Limited, Fortitude Valley (AU); Compaq Computer Australia Pty Ltd., Adelaide (AU); RLM Systems Pty Ltd, Burwood East (AU); CEA Technologies Inc., Fyshwick (AU)

( * ) Notice: Subject to any disclaimer, the term of this patent is extended or adjusted under 35 U.S.C. 154(b) by 421 days.

(21) Appl. No.: 10/484,530

(22) PCT Filed: Jul. 19, 2002

(86) PCT No.: PCT/AU02/00969

§ 371 (c)(1),
(2), (4) Date: Jan. 16, 2004

(87) PCT Pub. No.: WO03/009233

PCT Pub. Date: Jan. 30, 2003

(65) Prior Publication Data

US 2005/0260583 A1    Nov. 24, 2005

(30) Foreign Application Priority Data

Jul. 19, 2001    (AU)    .................................. PR 6478

(51) Int. Cl.
*G01N 33/48*    (2006.01)
(52) U.S. Cl. ...................................................... 702/19
(58) Field of Classification Search ................ 702/19
See application file for complete search history.

(56) References Cited

U.S. PATENT DOCUMENTS 6,026,174 A    2/2000    Palcic et al.

FOREIGN PATENT DOCUMENTS

WO    WO 99/52074    10/1999
WO    WO 02/03331 A1    1/2002

OTHER PUBLICATIONS

Adiga et al. "Region Based Techniques for Segmentation of Volumetric Histo-pathological Images," Computer Methods and Programs in Biomedicine (Jan. 2000) vol. 61, pp. 23-47.*

Montironi et al. "Nuclear Changes in Normal-Looking Columnar Epithelium Adjacent to and Distant from Prostatic Intraepithelial Neoplasia and Prostate Cancer," Virchows Arch (2000) vol. 437, pp. 625-634.*

Slobodan Ilie et al., *Seeded Region Growing Method for Image Segmentation*, Graduate School in Computer Science, The Swiss Institute of Technology, Aug. 9, 2000, http://ligwww.epfl.ch/~silic/predocschool/ComputerVision/cvision.html.

Andrew Mehnert et al., *An Improved Seeded Region Growing Algorithm*, Pattern Recognition Letters, vol. 18 (10), Elsevier Science B.V., 1997, pp. 1065-1071.

M. Beil et al., *A Dual Approach to Structural Texture Analysis in Microscopic Cell Images*, Computer Methods and Programs in Biomedicine, vol. 48(3), Elsevier Science Ireland, Dec. 1995, pp. 211-219.

F. Albregtsen et al., *Texture Classification of Mouse Liver Cell Nuclei Using Invariant Moments of Consistent Regions*, Computer Analysis of Images and Patterns, 6th International Conference CAIP 1995, Proceedings, Springer-Verlag, Berlin, Germany, 1995, pp. 496-502.

A. Kondo et al., *Evaluation of the Chromatin for Cell Images*, Systems and Computers in Japan, vol. 17(9), Scripta Technica Inc., Sep. 1986, pp. 11-19.

Richard Beare et al., *Exact Seeded Region Growing for Image Segmentation*, Proceedings of the Fifth International/National Biennial Conference on Digital Image Computing, Techniques, and Applications (DICTA'99), Dec. 7-8, 1999, Perth, Western Australia, pp. 132-137.

Jean-Francois Rivest et al. *Morphological Gradients*, Journal of Electronic Imaging, vol. 2, No. 4, Oct. 1993, pp. 326-336.

Cotsaces and Pitas, *Computing the Watersheds of Large Three-Dimensional Images Using Limited Random Access Memory*, The Netherlands, Kluwer Academic Publishers, ISBN 0-7923-5133-9, 1998, pp. 239-246.

Heinz K. Grohs et al., *Automated Cervical Cancer Screening*, Igaku-Shoin Medical Publishers, New York, ISBN: 0-89640-255-X, 1994, pp. 24-38.

J. Serra, *Image Analysis and Mathematical Morphology*, vol. 1, Academic Press, London, ISBN 0-12-637240-3, 1982, pp. 220-223.

Per Erik Danielsson, *A New Shape Factor*, Computer Graphics and Image Processing, vol. 7, 1978, pp. 292-299.

(Continued)

*Primary Examiner*—Jerry Lin
*Assistant Examiner*—Shubo (Joe) Zhou
(74) *Attorney, Agent, or Firm*—Workman Nydegger

(57) ABSTRACT

A method of segmenting chromatin particles in a nucleus of a cell by locating regional minima in an image, computing a zone of influence (ZOI) around each regional minimum, and segmenting a single chromatin blob within each ZOI using a region growing procedure. The method can be used as the basis of a method of qualitatively characterizing the distribution of nuclear chromatin by computing features for individual chromatin particles. Chromatin features can be synthesized from the features of individual particles and particle features can be synthesized into nucleus features and slide features. The method is useful for detecting malignancy associated changes and changes during neoplasia. The method may also be used more generally to assess chromatin patterns in living cells during the cell life cycle. This makes it possible to measure alternations in the evolving patterns that result from pathological or environmental influences.

24 Claims, 13 Drawing Sheets

OTHER PUBLICATIONS

Jean-Francois Rivest et al., *Physical Significance Of Image Measurements*, IEEE Transactions on Instrumentation and Measurement; vol. 44, No. 3, Jun. 1995, pp. 751-754.

Andrew J.H. Mehnert et al., *On Computing The Exact Euclidean Distance Transform On Rectangular And Hexagonal Grids*, Journal of Mathematical Imaging and Vision, vol. 11, 1999, pp. 223-230.

Luc Vincent, *Graphs And Mathematical Morphology*, Signal Processing, vol. 16, 1989, pp. 365-388.

John C. Russ, *The Image Processing Handbook*, Florida, CRC Press, ISBN 0849342333, 1992, p. 336.

Jun-Ichiro Toriwaki et al., *Voronoi and Related Neighbors on Digitized Two-Dimensional Space With Applications to Texture Analysis*, in Computational Morphology: A Computational Geometric Approach To The Analysis Of Form, Toussaint (Ed.), Elsevier Science Publishers, Amsterdam, ISBN: 0444704671, 1988, pp. 207-228.

Ross Francis Walker, *Adaptive Multi-Scale Texture Analysis: With Application to Automated Cytology*, PhD Thesis, School of Computer Science and Electrical Engineering, The University of Queensland, Australia, 1997, Chapter 2.

Henk J.A.M. Heijmans, *Morphological Image Operators*, Academic Press, San Diego, ISBN: 0-12-014599-5, 1994, pp. 325-331.

Ian T. Young et al., *Characterization Of Chromatin Distribution In Cell Nuclei*, Cytometry, vol. 7, 1986, pp. 467-474.

Gunter Wolf et al., *Chromatin Structure Analysis Based On A Hierarchic Texture Model*, Analytical and Quantitative Cytology and Histology, vol. 17, No. 1, 1995, pp. 25-34.

Luc Vincent et al., *Watersheds In Digital Spaces: An Efficient Algorithm Based On Immersion Simulations*, IEEE Transactions on Pattern Analysis and Machine Intelligence, vol. 13, No. 6, 1991, pp. 583-598.

Rafael C. Gonzalez et al.,, *Digital Image Processing*, Addison-Wesley, Reading, Massachusetts, ISBN: 0-201-50803-6, 1992, pp. 191-195.

Luc Vincent, *Morphological Grayscale Reconstruction in Image Analysis: Applications and Efficient Algorithms*, IEEE Transactions on Image Processing, vol. 2, No. 2, Apr. 1993, pp. 184-185.

Michael Grimaud, *A New Measure Of Contrast: The Dynamics*, Proceedings of the SPIE—The International Society for Optical Engineering, vol. 1769, 1992, pp. 292-305.

Corinne Vachier et al., *Valuation Of Image Extrema Using Alternating Filters by Reconstruction*, Proceedings of the SPIE—The International Society for Optical Engineering, vol. 2568, 1995, pp. 94-103.

*Mathematical Morphology in Image Processing*, E. R. Dougherty (Ed.), chapter 12, Marcel Dekker, Inc., New York, ISBN: 0-8247-8724-2, 1993, pp. 433-481.

S. Beucher et al., "*Use of Watersheds in Contour Detection,*" in International Workshop on Image Processing; Real-time Edge and Motion Detection/Estimation held on Sep. 17-21, 1979, Centre de Geostatistique et de Morphologie Mathmatique, pp. 2.1-2.12.

F. Meyer et al., "*Morphological Segmentation,*" Journal of Visual Communication and Image Representation, vol. 1, No. 1, Sep. 1990, pp. 21-46.

F. Meyer, "*Un Algorithme Optimal de Ligne de Partage des Eaux,*" in Proceedings of the 8e Congres Reconnaissance des Formes et Intelligence Artificielle, held on Nov. 25-29, 1991, pp. 847-857.

\* cited by examiner

CHROMATIN SEGMENTATION

This invention is a method for segmenting (delineating) the chromatin in the nucleus of a cell. Chromatin is visualized by light microscopy as a patchwork of light and dark regions. The dark regions correspond to areas of high optical density and are blob-like or particle-like in appearance. The light regions correspond to areas of clearing and can also be interpreted as blobs or particles. In particular, though not exclusively, this invention is a method for segmenting these light and dark particles.

BACKGROUND TO THE INVENTION

The distribution of the chromosomes or DNA in the nuclei of cells can be quantitatively measured using a computer and image analysis techniques. Moreover, these measurements or features can be used to detect both malignancy associated changes (MACs), and changes during neoplasia. The features that appear to have the most discriminatory power are texture features. Such features quantitatively describe the intensity variation of the chromatin (the substance that constitutes the chromosomes or DNA and is readily visualized by staining) in the nucleus of a cell. The most widely used chromatin texture features are based on a statistical or probabilistic assessment of the gray-levels (intensity levels or optical density levels) in the cell nucleus. Unfortunately these features are difficult to relate to the terms and adjectives (e.g. granularity, compaction, margination, clumping, chromatin particles, condensation) used by cytologists to describe chromatin texture. Moreover they are usually defined at the pixel level and therefore fail to take into account the structural aspect of the chromatin distribution; e.g. this is true of all but the discrete texture features described in the United States Patent of Palcic et al. [System and method for automatically detecting malignant cells and cells having malignancy-associated changes; U.S. Pat. No. 6,026,174 dated Feb. 15, 2000]. Therefore their efficacy in relation to quantifying chromatin distribution is questionable.

An alternative approach to computing chromatin texture features is to segment the chromatin into aggregates and then to synthesize chromatin features from quantitative features computed for these aggregates. This approach has two advantages: (i) the segmentation step introduces structural information, and (ii) the synthesized features can be related to qualitative descriptions of chromatin texture made by cytologists. The key to this approach is the segmentation step. Several different methods of chromatin segmentation have been published in the literature. A characteristic they have in common is that they require the a priori specification of one or more operational parameters such as threshold values and region merging criteria. Moreover these parameters need to be tuned to the particular application. As a consequence these methods are not robust to changes in, or non-uniformity of, illumination and staining. The quality of the segmentations produced is arguably poor. This in turn affects the quality of the chromatin features that are computed from such segmentations. This is likely one of the major reasons that such features, with the exception of those of Young, Verbeek, and Mayall [Characterization of chromatin distribution in cell nuclei; Cytometry; vol. 7; 1986; pp. 467-474], have not found widespread use. Another possible reason is that the software implementation of the segmentation step is complicated.

Three existing methods of chromatin segmentation deserve special attention. The first is the method of Young, Verbeek, and Mayall because it is the basis of the discrete texture features detailed in the aforementioned United States Patent of Palcic et al. The second is the method of Wolf, Beil, and Guski [Chromatin structure analysis based on a hierarchic texture model; Analytical and Quantitative Cytology and Histology; vol. 17; no. 1; 1995; pp. 25-34] because it utilizes the watershed transform as does the preferred embodiment of the present invention. The third is the method of Kondo and Taniguchi [Evaluation of the chromatin for cell images; Systems and Computers in Japan; vol. 17; no. 9; 1986; pp. 11-19] because it represents the closest known prior art to the present invention.

The Young, Verbeek, and Mayall (YVM) method of chromatin segmentation takes as input a digitized image of a cell nucleus visualized by light microscopy. Young, Verbeek, and Mayall illustrate their method on images obtained from foam cells in human nipple aspirate fluid, and rat urothelial cells. The method of staining is unspecified. The YVM chromatin segmentation method involves nothing more than partitioning the gray-level histogram of the nucleus image into three parts (i.e. choosing two gray levels), and then using this division to label each nucleus pixel. The result is a segmentation comprising regions of low, medium, and high optical density. The manner in which the partition points (threshold values) are determined must be a priori specified. Although the YVM segmentation method is simple (hence its relative popularity) the quality of the segmentation is questionable for the following two reasons. Firstly, the method of segmentation utilizes only the intensity histogram and does not take into account any spatial information. Secondly, the method requires the specification of two threshold values. The manner in which these are chosen must be a priori specified. Moreover they must be tuned to the particular application.

The Wolf, Beil, and Guski (WBG) method of chromatin segmentation takes as input a digitized image of a cell nucleus, visualized by light microscopy, from a cervical tissue section obtained by colposcopic biopsy and stained by the Feulgen method. The WBG method consists of two steps. The first step involves determining the watershed of the gradient of the input image. This is done using a modification of the classic watershed algorithm of Vincent and Soille [Watersheds in digital spaces: an efficient algorithm based on immersion simulations; IEEE Transactions on Pattern Analysis and Machine Intelligence; vol. 13; no. 6; 1991; pp. 583-598]. The result is an oversegmentation; i.e. too many regions are delineated and as a consequence the result does not correspond very well to the chromatin patches in the original image. The second step involves selectively merging the regions segmented in the first step. Specifically, this step involves fitting a plane to each segmented region using standard least-squares techniques and then iteratively merging neighboring regions based on merging criteria related to the standard deviation of gray-levels in the regions. The decision to merge two regions is based on the evaluation of a single parameter that is then compared to a threshold value. This is a drawback of the method because the manner in which this threshold value is determined must be a priori specified.

The Kondo and Taniguchi (KT) method of chromatin segmentation represents the closest known prior art to the present invention. The method takes as input a digitized image of a cell nucleus, visualized by light microscopy, from a Pap smear. The method comprises three steps: (i) local maxima (with respect to optical density) are located in the input image (these correspond to local minima of intensity), (ii) the input image is partitioned into sub-images (regions), each containing a single maximum, and (iii) a chromatin granule (densely stained blob of chromatin) is segmented from each region in turn using local adaptive thresholding. Kondo and Taniguchi propose three different methods for the partitioning step: (i)

partitioning using a Voronoi neighborhood, (ii) region partitioning by directed tree, and (iii) area expansion by difference direction. A drawback of the Voronoi neighborhood method is that it does not use the topography of the input image to determine a region around each minimum. Consequently it is possible that the region determined around a minimum cuts through one or more adjacent chromatin particles. A drawback of the directed tree method is that it is necessary to a priori select a sensitivity parameter to control growth. A drawback of the density difference method is that the growth is not prescribed by geodesic distance (i.e. if the image is viewed as a landscape then the growth is not prescribed by the topography of the landscape). The local adaptive thresholding method of segmenting a granule from each region has several potential drawbacks including sensitivity to noise and non-uniform illumination, and the need to prescribe the manner in which the threshold value is determined.

The present invention is specifically designed for the purpose of segmenting chromatin particles in the nucleus of a cell. The method takes as input an image of the nucleus of a cell. Consequently the task of segmenting a cell from a field of cells and the task of segmenting the nucleus from a single cell, are not the subjects of this invention. Indeed details of these tasks are described in International Patent Application number PCT/AU01/00787 (WO 02/03331) and co-pending International Patent Application number PCT/AU99/00231 (WO 99/52074) respectively.

OBJECT OF THE INVENTION

It is an object of the present invention to provide a means of segmenting chromatin in a nucleus of a cell.

SUMMARY OF THE INVENTION

In one form, although it need not be the only, or indeed the broadest form, the invention resides in a method of segmenting chromatin particles in the nucleus of a cell including the following steps of:
(i) locating regional minima in the image;
(ii) computing a zone of influence (ZOI) around each regional minimum; and
(iii) segmenting a single chromatin blob within each ZOI using a region growing procedure.

The input image is preferably a two-dimensional gray-scale image comprising only those pixels that define the nucleus of a cell. It will be appreciated that the method is not limited to two-dimensional gray-scale images. The method can be applied to three-dimensional images in which case regional minima will be sets of voxels rather than pixels. The method can also be applied to multi-valued (including multispectral) images.

The method may further include the step of evaluating the contrast of each regional minimum and discarding those regional minima that do not satisfy a priori specified contrast criteria.

The method may also include a preliminary step of pre-processing the input image to correct for degradations. The pre-processing step suitably removes degradations such as noise and blurring. The pre-processed image may optionally be up-sampled.

The regional minima are suitably regions of constant gray-value that are surrounded by pixels of strictly higher (lighter) gray-value. Each regional minimum identifies the location of a dark blob.

The method may also be applied to the photographic negative of an image to identify the locations of light blobs. This is equivalent to identifying regional maxima in the original (positive) image.

In preference, the step of computing a zone of influence is performed by means of seeded region growing, or catchment basins determined by the watershed transform, or influence zones (IZs) with respect to an a priori specified metric.

The segmentation step is suitably performed by means of either a watershed transform or a seeded region growing algorithm.

In a further form, the invention resides in a method of quantitatively characterizing the structure of nuclear chromatin including the steps of:
(i) obtaining an image of a cell nucleus showing chromatin texture;
(ii) locating regional minima in the image;
(iii) computing a zone of influence (ZOI) around each regional minimum;
(iv) segmenting a single chromatin blob within each ZOI using a region growing procedure; and
(v) computing features for individual chromatin blobs.

The method may further include the step of:
(vi) synthesizing chromatin features from the features computed for individual chromatin blobs.

The method may suitably include the further step of repeating steps (ii) to (v) for the negative of the image of step (i) and using the computed features in step (vi).

The method may further include the step of evaluating the contrast of each regional minimum in the image of the cell nucleus and discarding those regional minima that do not satisfy a priori specified contrast criteria.

The image of a cell nucleus may be a suitable gray-scale image.

BRIEF DESCRIPTION OF THE DRAWINGS

The preferred embodiment of the invention is described with reference to the following figures in which.

DETAILED DESCRIPTION OF THE PREFERRED EMBODIMENT

The preferred embodiment of the present invention is similar to the KT method in the sense that it involves the steps of locating minima in the intensity image, partitioning the image into regions each containing a single minimum, and then segmenting a single blob in each region. In contrast to the KT method the present invention locates regional minima (with respect to intensity) rather than local minima. A regional minimum is a region or connected component of constant gray-value that is surrounded by pixels of strictly higher (lighter) gray-value, whereas a local minimum is a pixel whose neighbors are of strictly higher gray-value. In contrast to the KT method the present invention, in its preferred embodiment, grows these minima using the watershed transform. If the input image is viewed as a topographic landscape (with the light pixels representing high points and the dark pixels -representing low points), then the boundaries of the regions determined by the watershed transform are guaranteed to lie between the minima as determined by the topography of the surface. In contrast to the KT method the present invention, in its preferred embodiment, segments a single blob in each region using the watershed transform.

Figure 1:
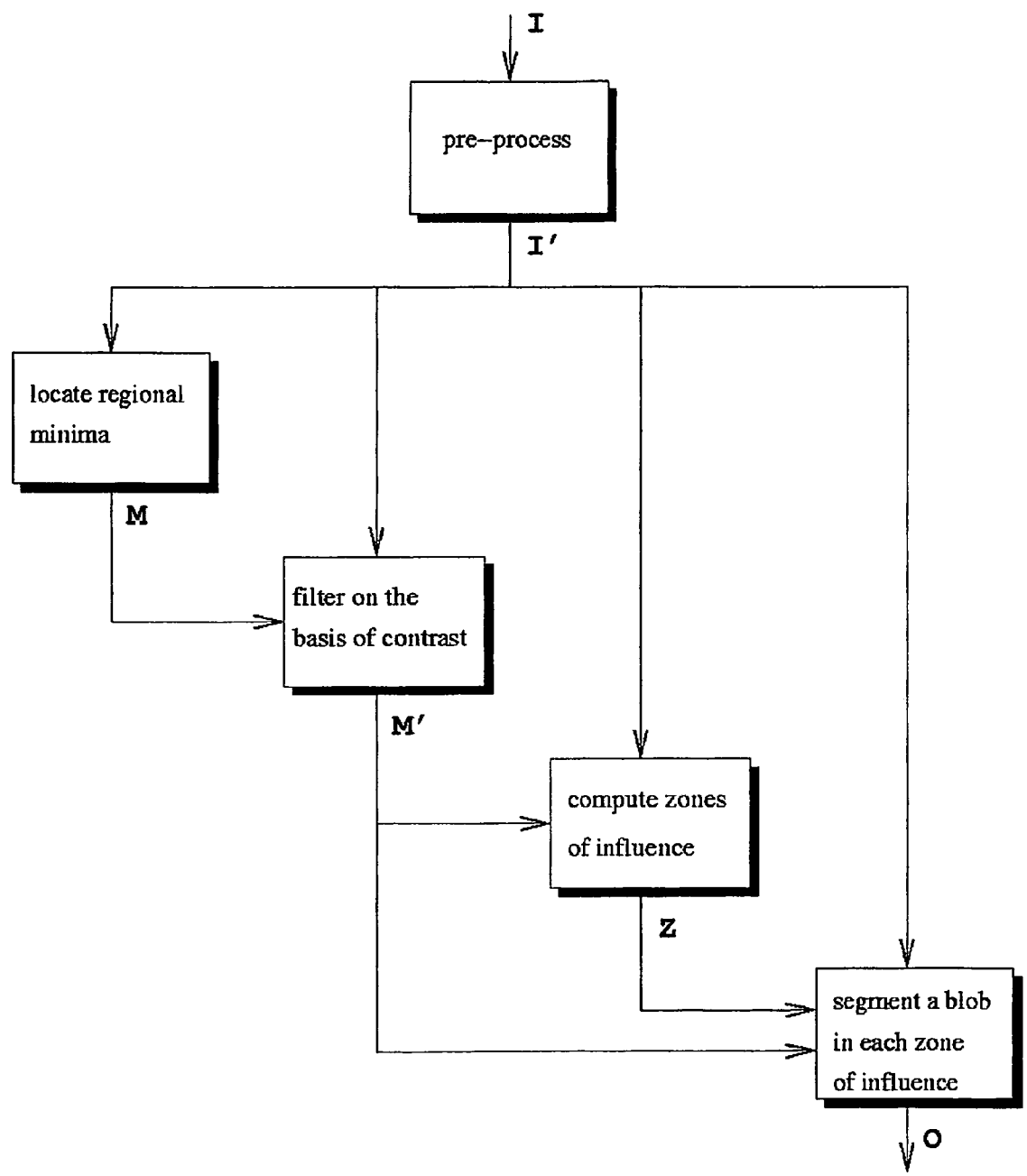
FIG. 1 is a flowchart showing the steps of the invention.
Figure 2:
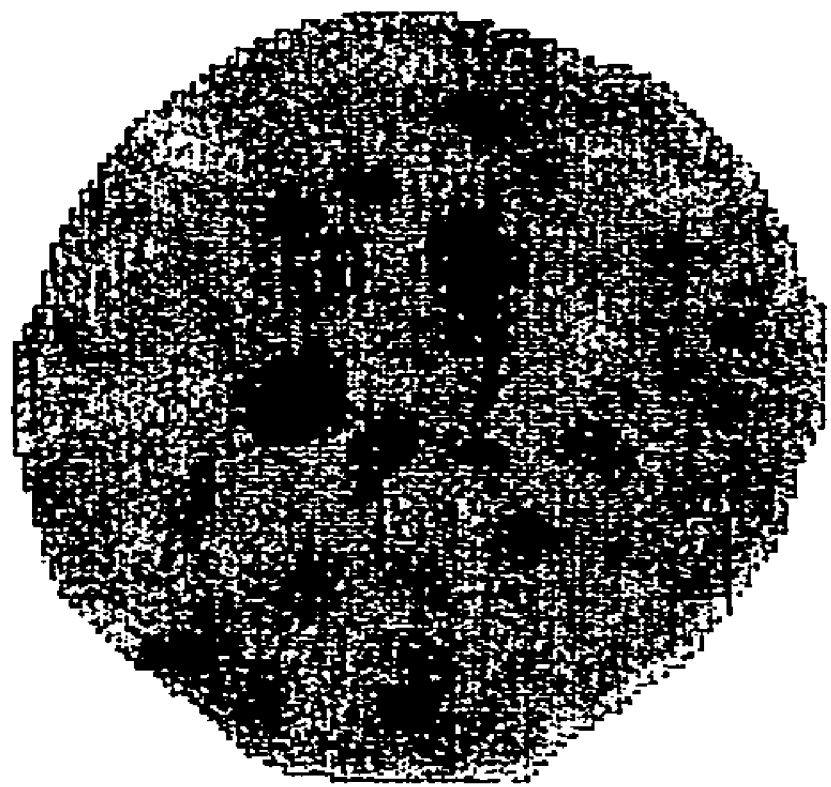
FIG. 2 is an example input to the present invention.
Figure 3:
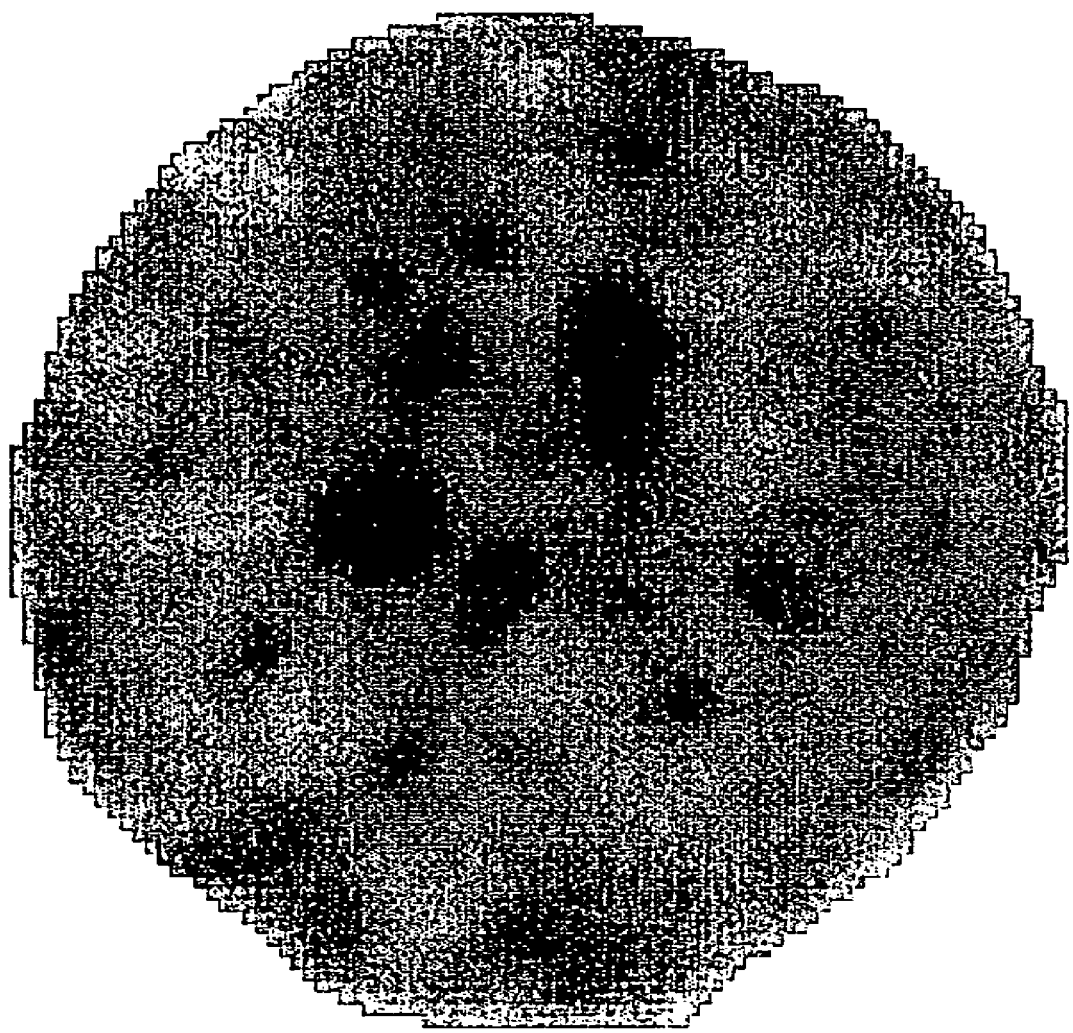
FIG. 3 shows the result after the application of a 3×3 median filter to FIG. 2 and then up-sampling by factor 2.

FIG. 1 is a flowchart of the steps in the preferred embodiment of the present invention. The input image is denoted by the letter I on the flowchart. It is a gray-scale image in which the chromatin is visualized as a patchwork of light and dark regions. The darker the region, the more optically dense is the chromatin. FIG. 2 is an example of such an image. The white area surrounding the gray area is not considered to be part of the image. The first optional step is pre-processing. Depending on the quality of I, this step may include filtering to attenuate noise, deconvolution to correct for blur, and up-sampling to facilitate line rendering in subsequent steps. The preferred method of pre-processing involves the application of a 3×3 median filter [Gonzalez & Woods; Digital image processing; Addison-Wesley; Reading, Mass.; ISBN: 0-201-50803-6; 1992; pp. 191-195] followed by up-sampling by factor 2. The preferred method of up-sampling by factor 2 involves nothing more than replacing each pixel with a 2×2 block of pixels of the same gray-value. FIG. 3 shows the result after applying the preferred method of pre-processing to the image I of FIG. 2. The pre-processed image is denoted I' on the flowchart.

Figure 4:
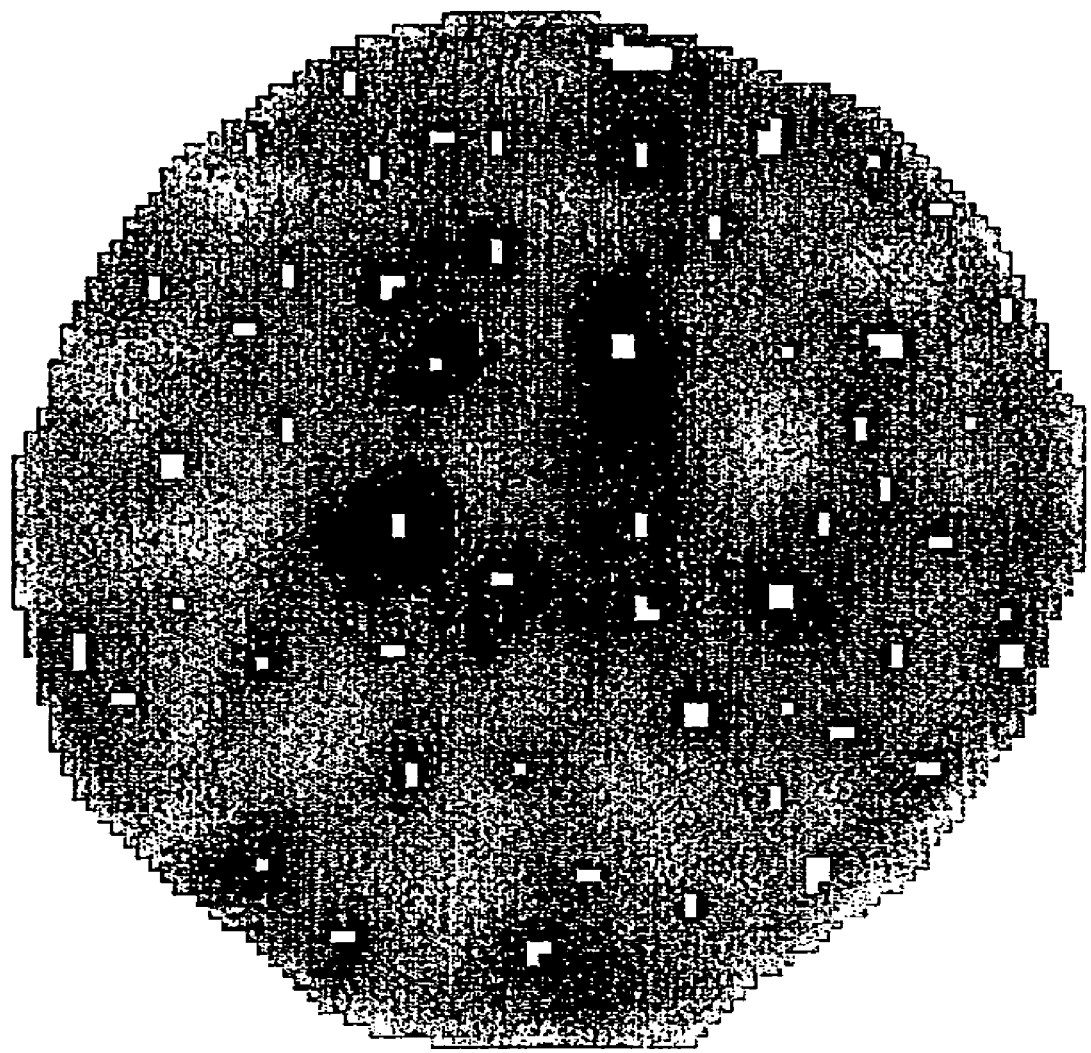
FIG. 4 shows the location of the regional minima of FIG. 3 (depicted as small white regions or connected components)

The next step is to locate the regional minima in the pre-processed image I'. A regional minimum is a region or connected component, comprising one or more pixels of constant gray value, that is surrounded by pixels of strictly higher (lighter) gray value. The output from this step is a binary image M containing connected components, each of which marks the location of a regional minimum. Several methods for detecting regional minima exist in the literature; e.g. the grayscale reconstruction method of Vincent [Morphological grayscale reconstruction in image analysis: applications and efficient algorithms; IEEE Transactions on Image Processing; vol. 2; no. 2; April 1993; pp. 184-185]. The present invention does not require that any particular method be employed. FIG. 4 shows the location of the regional minima of the pre-processed image I' of FIG. 3 (the image M consists of the small white connected components).

As mentioned earlier, the preferred embodiment is described by reference to two-dimensional gray-scale images. It will be appreciated that the process may be generalized to locate sets of voxels in a three-dimensional image rather than sets of pixels in a two-dimensional image.

The next optional step is to filter the image M according to a priori specified contrast criteria. This involves computing a contrast valuation, with respect to the pre-processed image I', for each regional minimum, and then discarding those minima that do not satisfy the contrast criteria. The filtered image is denoted M' on the flowchart. Two particularly useful contrast measures are dynamics devised by Grimaud [A new measure of contrast: the dynamics; Proceedings of the SPIE—The International Society for Optical Engineering; vol. 1769; 1992; pp. 292-305] and symmetrical dynamics devised by Vachier and Vincent [Valuation of image extrema using alternating filters by reconstruction; Proceedings of the SPIE—The International Society for Optical Engineering; vol. 2568; 1995; pp. 94-103]. The preferred measure of contrast is dynamics. The preferred contrast criterion is to select all regional minima with a dynamics value of 1 or greater. Effectively this preferred criterion leads to all of the connected components of M being retained; i.e. M'=M. Whilst from a segmentation point of view the preferred contrast criterion has no effect on the final segmentation, the computed dynamics values do provide a set of valuable features from which chromatin features can subsequently be computed (an intended application of the present invention).

Figure 5:
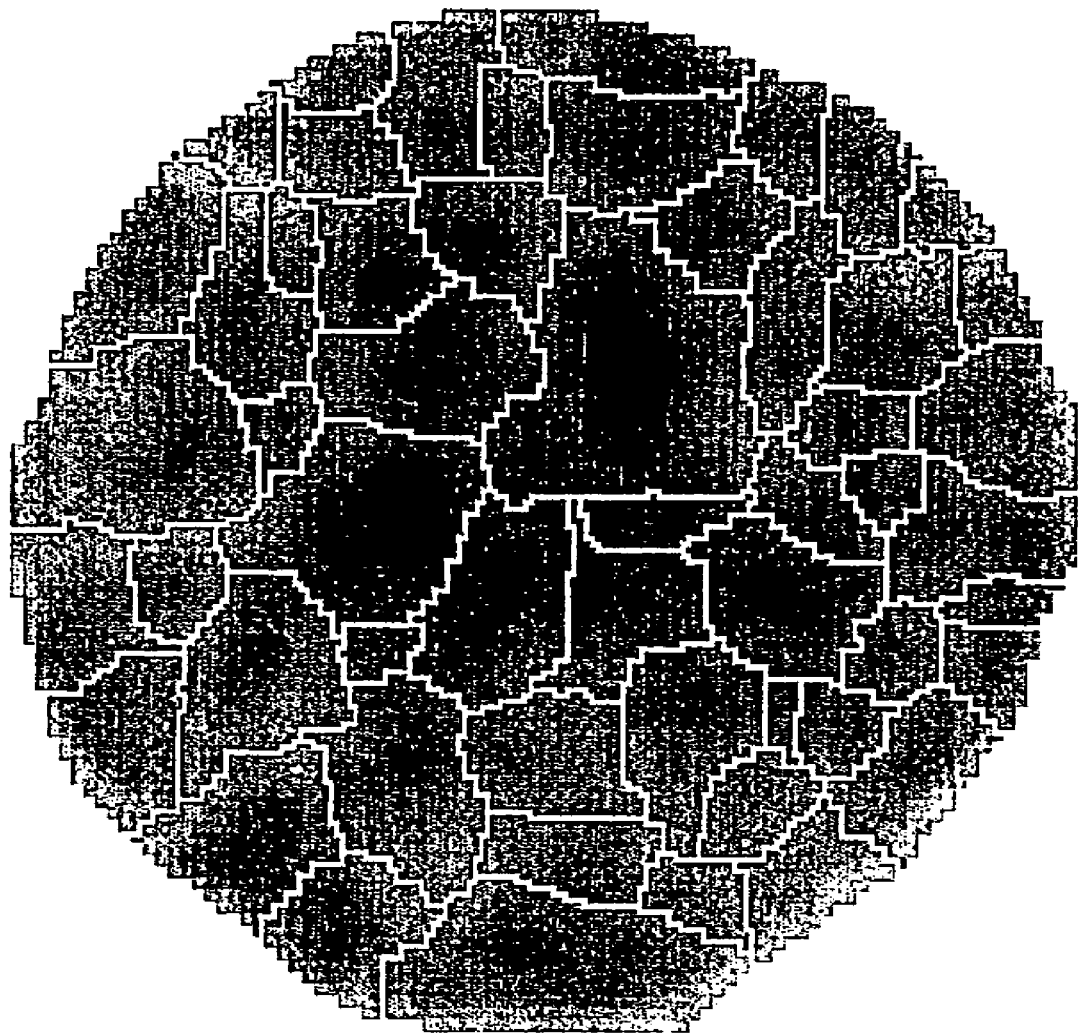
FIG. 5 shows the watershed lines (white lines) produced by the application of the watershed transform to the image in FIG. 3 using the white regions of FIG. 4 as markers.

The next step is to compute a zone of influence (ZOI) around each of the connected components in M'. The image containing the ZOIs is denoted by Z on the flowchart. Depending on the method of implementation, Z may be either a binary image of lines delineating the zones of influence or it may be a gray-scale image in which each ZOI has its own unique numerical label. The preferred method for computing Z is to apply the watershed transform [Beucher & Meyer; The morphological approach to segmentation: the watershed transformation; in Mathematical morphology in image processing; E. R. Dougherty (Ed.); chapter 12; Marcel Dekker, Inc., New York; ISBN: 0-8247-8724-2; 1993; pp. 433-481] to the pre-processed image I' using the connected components of M' as markers. Another possibility is to apply a scan-order-independent seeded region growing algorithm—such as that of the inventors, Mehnert and Jackway [An improved seed region growing algorithm; Pattern Recognition Letters; vol. 18; 1997; pp. 1065-1071] or that of Beare and Talbot [Exact seeded region growing for image segmentation; Proceedings of the Fifth International/National Biennial Conference on Digital Image Computing, Techniques, and Applications (DICTA'99); 7-8 December, Perth, Western Australia; 1999; pp. 132-137]—the pre-processed image I' using the connected components of M' as seeds. Yet another possibility is to determine the influence zone (IZ) around each connected component of M' using an a priori specified metric. The IZ of a connected component is the set of all pixels that are closer to it than to any other connected component. FIG. 5 shows the result (white lines) of the preferred method; i.e. the application of the watershed transform to image I' of FIG. 3 using the connected components M' of FIG. 4 as markers.

Figure 6:
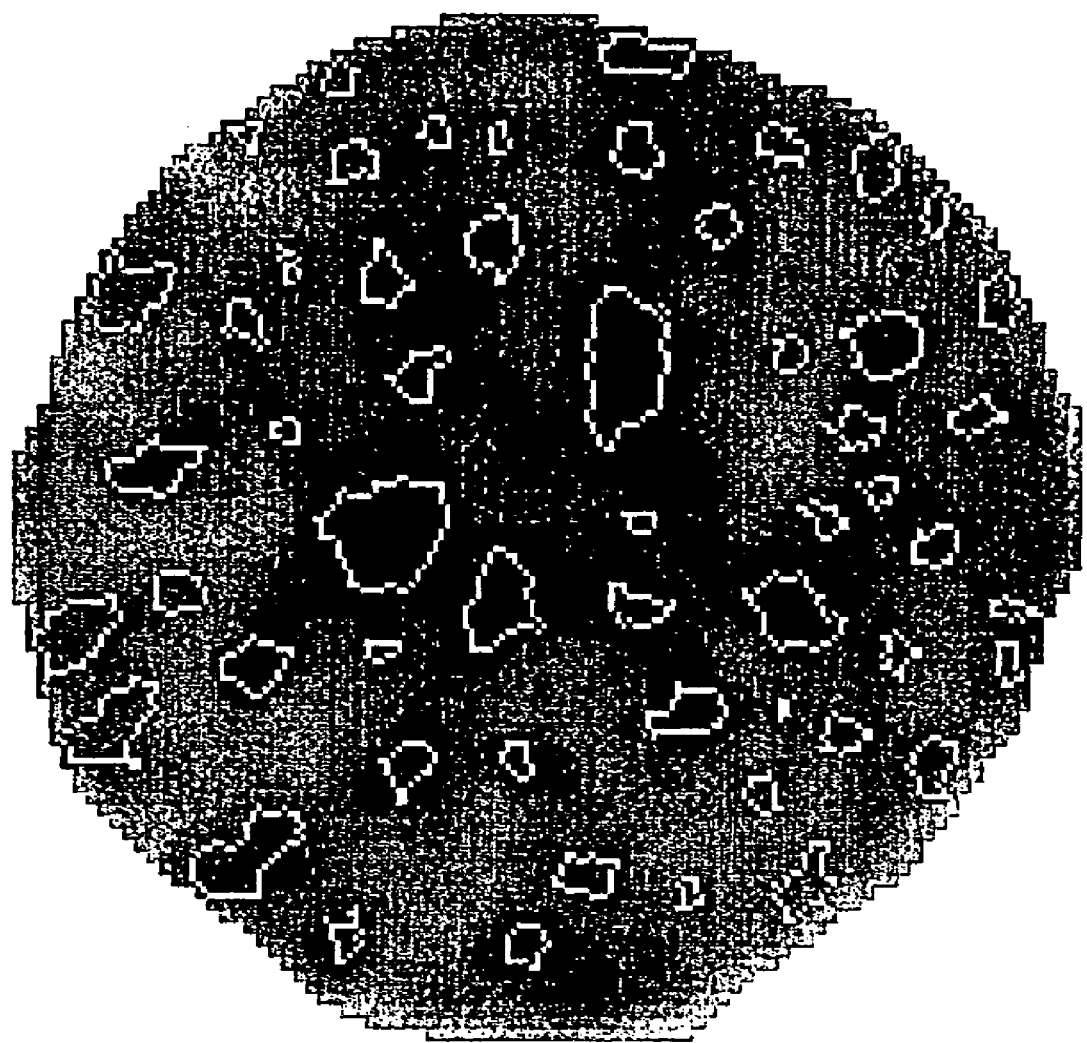
FIG. 6 shows the watershed lines (white lines) produced by the application of the watershed transform to the morphological gradient of the image in FIG. 3 using the white regions of FIG. 4 and the white lines of FIG. 5 as markers. The white lines in this figure delineate the chromatin particles defined by the topography of the gradient image.
Figure 7:
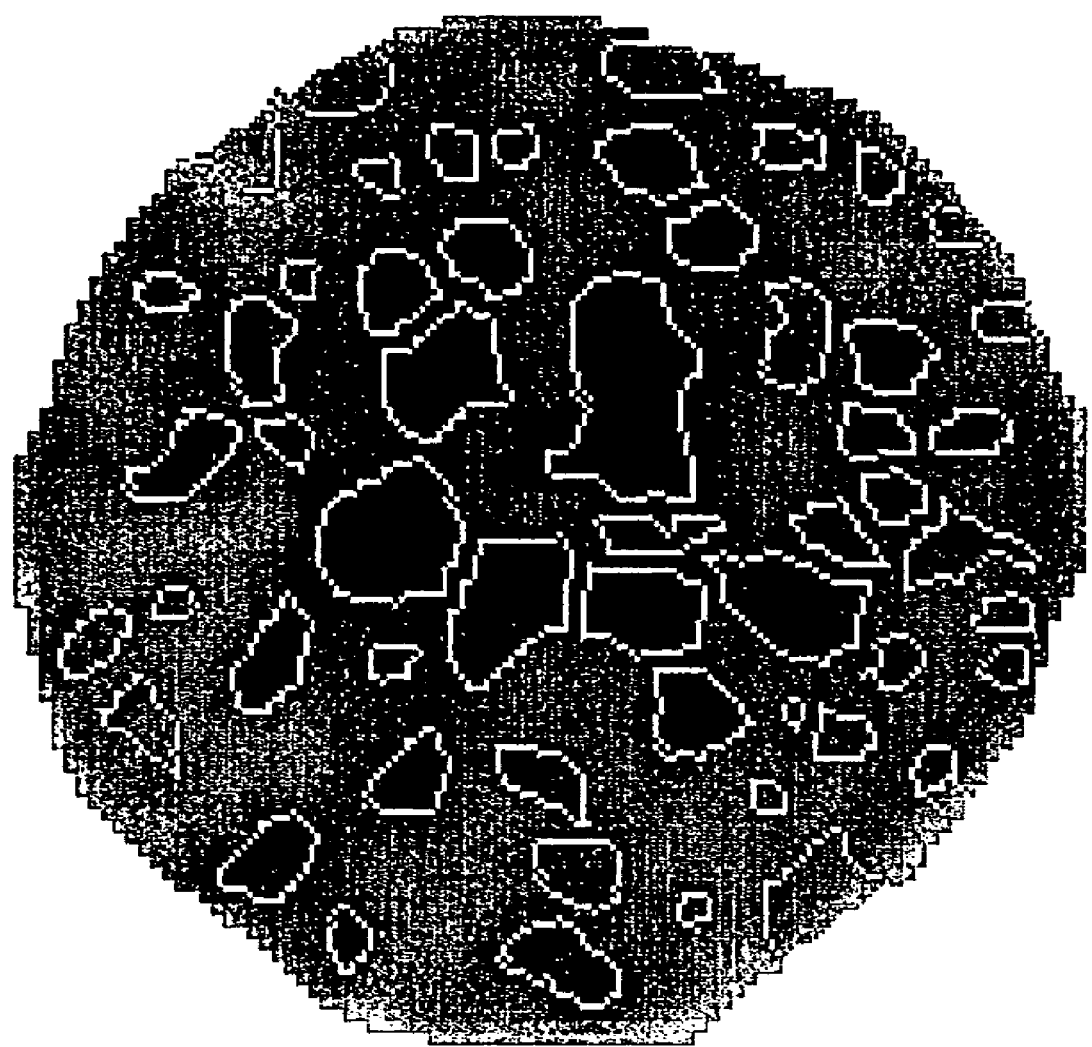
FIG. 7 shows the boundary lines (white lines) produced by the application of a seeded region growing algorithm to the image in FIG. 3 using the white regions of FIG. 4 and the white lines of FIG. 5 as seeds. The white lines in this figure delineate chromatin particles defined by the homogeneity criteria of the seeded region growing algorithm (in this case the homogeneity of gray values)

The next step is to segment a single blob (chromatin particle) within each ZOI in Z. This is done using a region growing procedure. The preferred method for doing this is to apply the watershed transform to the modulus of the gradient of the pre-processed image I' using both the connected components of M' and the boundary lines of Z as markers (these boundary lines may or may not include the boundary of the entire nucleus itself; the preferred method is not to include this). Numerous methods for computing the modulus of the gradient exist in the literature. The preferred method is the discrete morphological gradient [Rivest, Soille, & Beucher; Morphological gradients; Journal of Electronic Imaging; vol. 2; no. 4; 1993; pp. 326-336]. Another possibility for segmenting the chromatin blobs is to apply a scan-order-independent seeded region growing algorithm to the pre-processed image I' using both the connected components of M' and the boundary lines of Z as seeds (once again these boundary lines may or may not include the boundary of the entire nucleus itself). FIG. 6 shows the result of the preferred method; i.e. the application of the watershed transform to the morphological gradient of the image I' of FIG. 3 using the connected components of M' shown in FIG. 4 and the watershed lines (boundary lines of Z) shown in FIG. 5 as markers. FIG. 7 shows the result of the alternative method; i.e. the application of seeded region growing to the image I' of FIG. 3 using the connected components of M' shown in FIG. 4 and the watershed lines (boundary lines of Z) shown in FIG. 5 as seeds.

Figure 8:
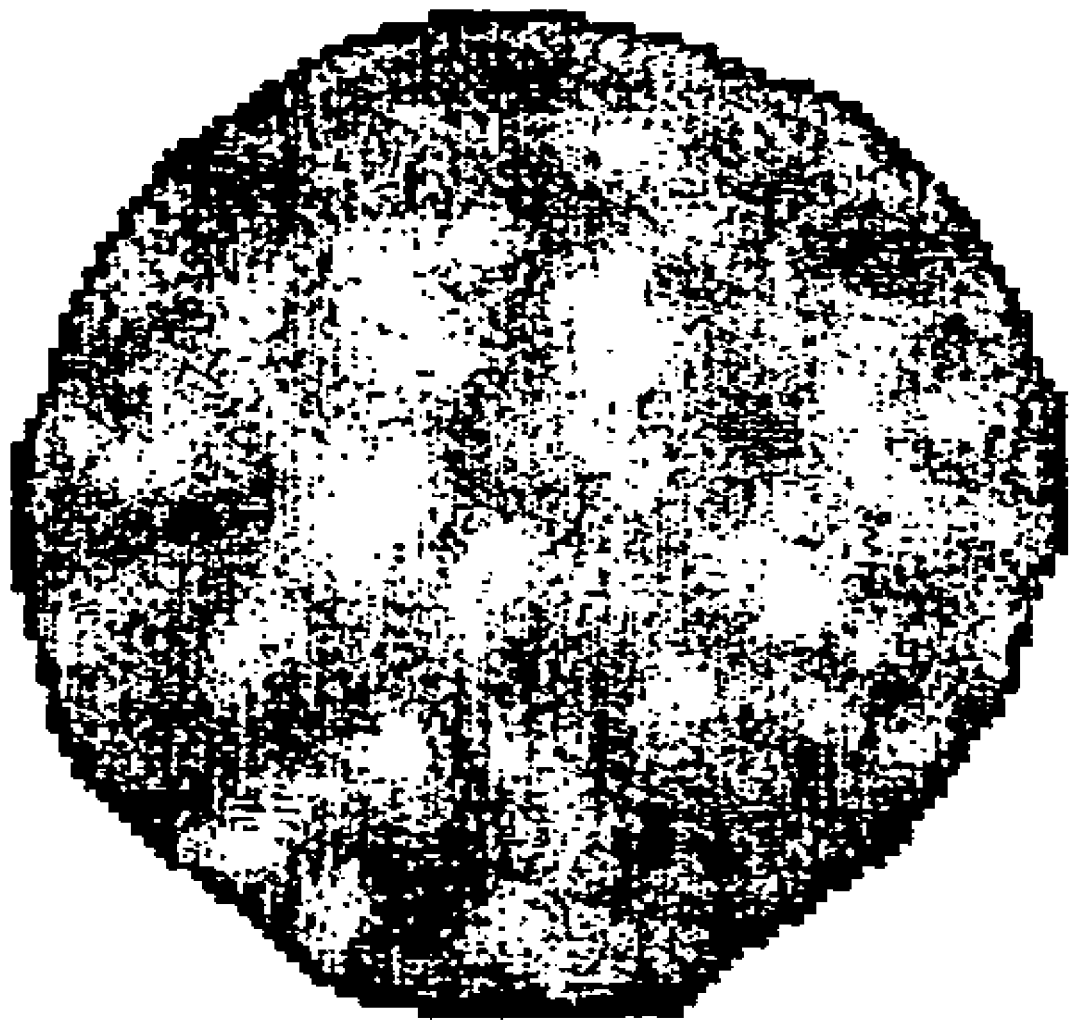
FIG. 8 shows the negative of the image in FIG. 2.
Figure 9:
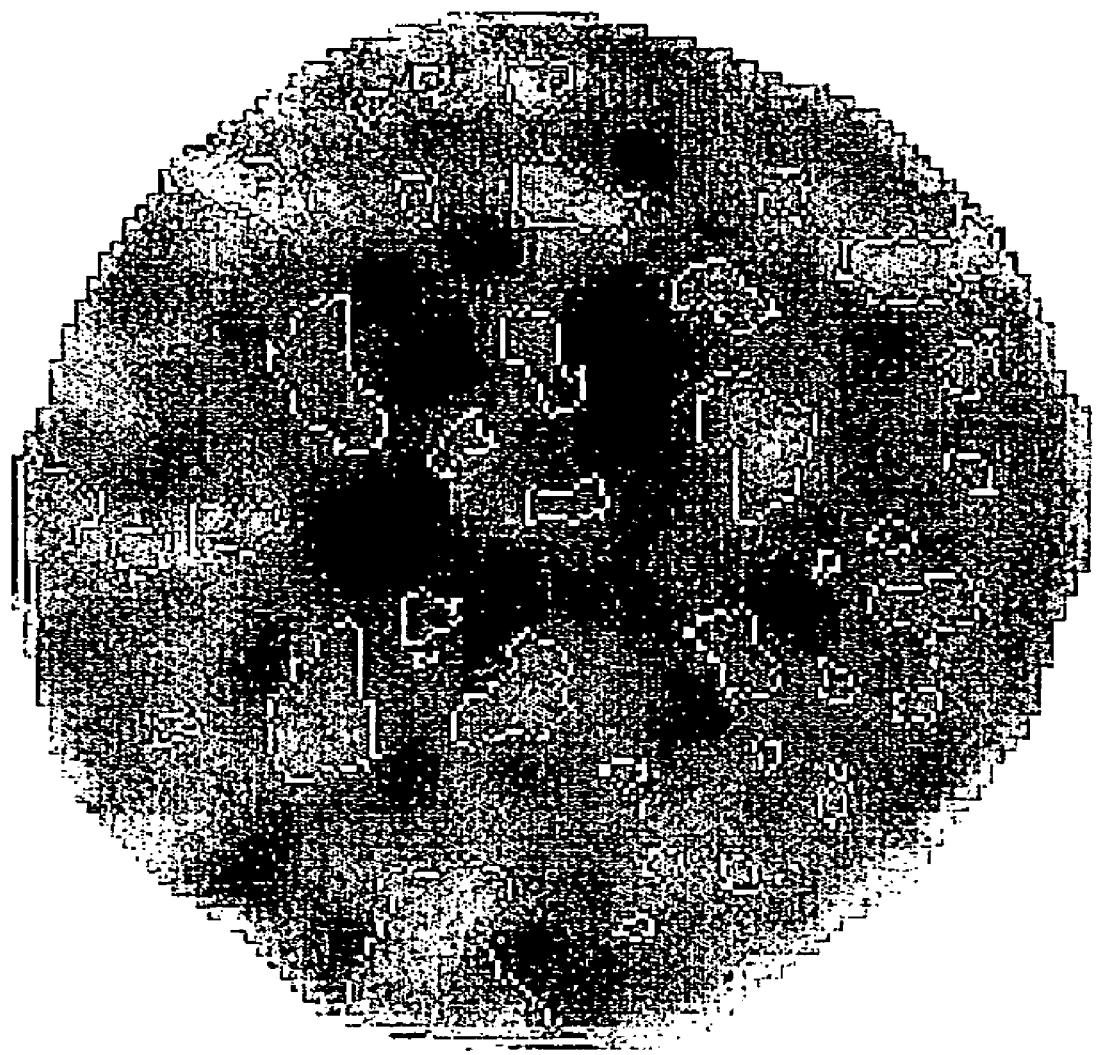
FIG. 9 shows the segmentation produced when FIG. 8, rather than FIG. 2, is used as the input to the preferred embodiment of the present invention.

If the input image I is replaced with its photographic negative (for an 8-bit gray-scale image with gray-values ranging from 0 to 255 this amounts to subtracting each pixel's value from 255) then the (dark) particles segmented by the present invention will correspond to light particles in the original positive image. FIG. 8 shows the photographic negative of the image in FIG. 2. FIG. 9 shows the segmentation produced by the preferred embodiment of the present invention when FIG. 8 is used as the input.

Although the preceding discussion has been based upon two-dimensional gray-scale images, the inventors envisage that the invention can be applied to higher dimensional images, and to multispectral and other multi-valued images. For example, the invention can be applied to color images for which each pixel has multiple components. The nature of these components is dictated by the underlying color model such as HLS (hue, luminance, saturation), YIQ (luminance, in-phase, quadrature), CMY (cyan, magenta, yellow), and RGB (red, green, Blue). HLS, YIQ, CMY, and RGB are all multi-value images. The seeded region growing algorithms aforementioned readily generalize to three-dimensional gray-scale images and to color images. A three-dimensional version of the watershed transform also exists [Cotsaces and Pitas; Computing the watersheds of large three-dimensional images using limited random access memory; in Mathematical Morphology and its Applications to Image and Signal Processing; Dordrecht, The Netherlands; Kluwer Academic Publishers; ISBN 0-7923-5133-9; 1998; pp. 239-246].

A characteristic of all of the known chromatin segmentation methods is that they require the a priori specification of one or more operational parameters such as threshold values and region merging criteria. The present invention differs in that it is, in its preferred embodiment, a parameter-free method of segmenting chromatin particles. In addition, in comparison to existing methods, the present invention produces a discernibly better segmentation of nuclear chromatin; i.e. for any given nucleus image the method yields a segmentation of chromatin particles that corresponds well with what a human observer might intuitively perceive to be blobs or particles.

Persons skilled in the relevant art may realize variations from the preferred embodiment that will nonetheless fall within the scope of this invention. One such variation, for example, is to determine the ZOIs without rendering boundary lines, and then to segment a blob in each ZOI in turn (sequentially and independently).

The inventors believe that the most important application of the present invention is to the development and computation of features that quantitatively characterize the structure of nuclear chromatin. In particular these features can be synthesized from features computed for the individual chromatin particles including area, perimeter, volume, surface area, average gray-level, circularity, dynamics, number of neighbors, average distance to neighbors, and distance to nuclear boundary. In turn the inventors believe that such features have two very important applications. The first is that such features can be used to detect changes during neoplasia, and malignancy associated changes. The second is that such features can be used to select cell nuclei with sufficient texture for subsequent analysis using standard texture features (such as those described in the aforementioned patent of Palcic et al.) and/or features computed from the current invention.

The following discussion describes the computation of particle features and the synthesis of nucleus features and slide features. The discussion follows the gray-scale example used above.

Particle Features

Figure 10:
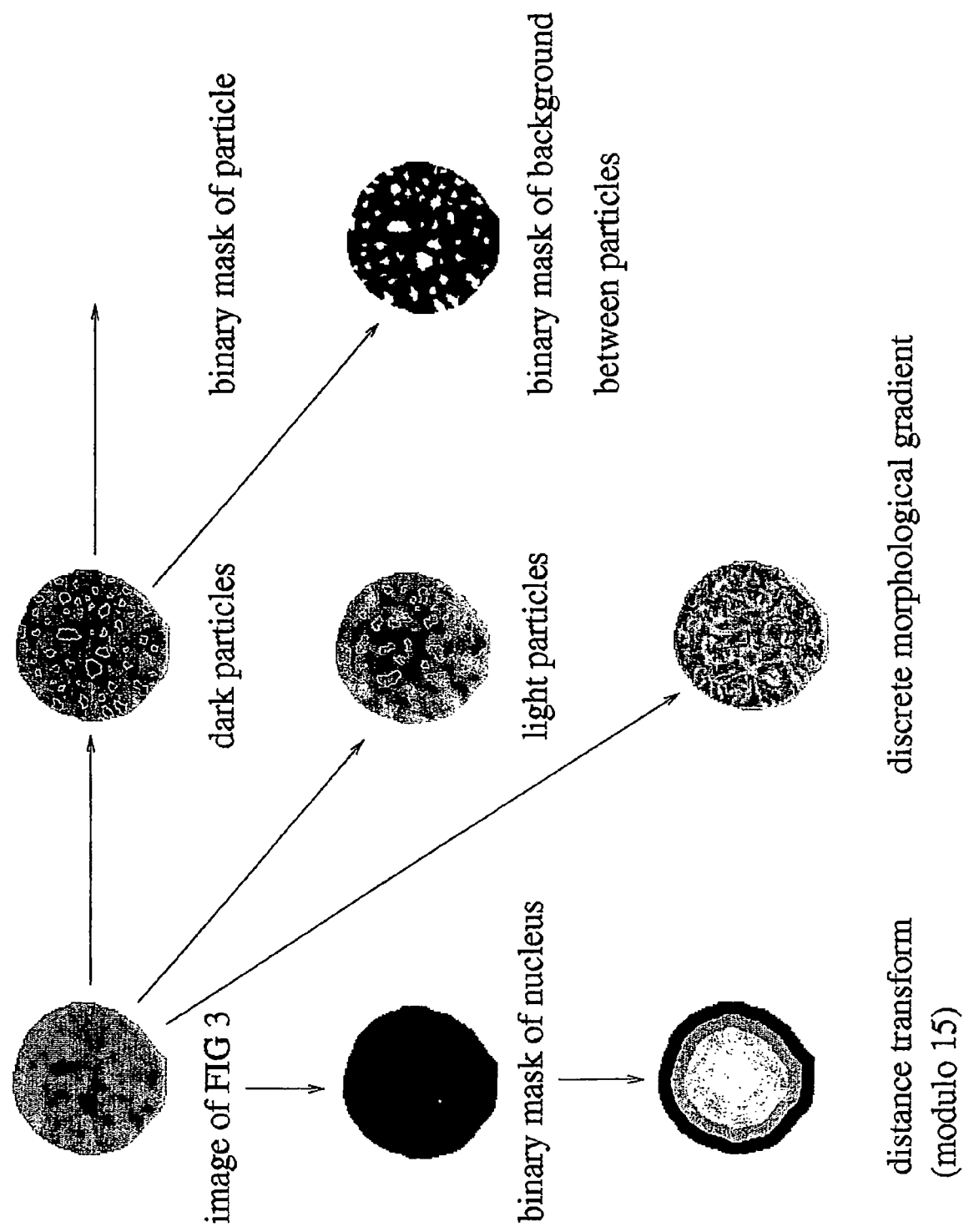
FIG. 10 shows examples of the intermediate images used to compute the preferred features of a particle.

In the preferred embodiment of the invention, features are computed for both the dark and light particles of a nucleus image. The former particles are found from a segmentation (using the procedure already described) of the nucleus image. The latter are found from a segmentation of the photographic negative of the nucleus image. FIG. 10 shows examples of the intermediate images used to compute the preferred features of a particle. FIG. 10 is not to scale. The reduction in scale can be gauged by comparing the top left image of FIG. 10 with FIG. 3. Each particle (an image object or region) is a distinct set of gray-level pixels in the nucleus image. The cardinality of each particle can be represented by a single connected component (binary mask). Numerous features can be found in the literature to characterize the size, shape, boundary and texture of image objects. Compendia of such features can be found in [Grohs & Husain (Eds.); Automated cervical cancer screening; IGAKU-SHOIN Medical Publishers; New York; ISBN: 0-89640-255-X; 1994; pp. 24-38] and in the aforementioned United States Patent of Palcic et al. Although these compendia describe features for the purpose of characterizing cell nuclei, the features can be applied more generally to any image object, including nuclear particles segmented by the present invention. In the preferred embodiment of the present invention, the following features are computed for each particle:

Morphometric Features

These features characterize the size, shape, and boundary of a connected component. In the preferred embodiment of the present invention, the following morphometric features are computed from the binary mask of a particle.

1. Area

This is defined as the number of pixels belonging to the particle; i.e. the number of pixels in the binary mask of the particle.

2. Perimeter

This is computed using the digital version of Crofton's formula [Serra; Image Analysis and Mathematical Morphology; Volume 1; Academic Press; London; ISBN 0-12-637240-3; 1982; pp. 220-223].

3. G factor

This is computed using the method described by Danielsson [A new shape factor; Computer Graphics and Image Processing; vol. 7; pp 292-299; 1978]

which defines G factor as a shape factor that quantitatively characterizes the shape of a binary image object based on the "average distance between a picture element and its nearest border point".

Densitometric Features

These features characterize the gray-level (optical density or intensity) variation of the pixels in an image object. These features characterize gray-level variation only (they do not take into account the positions of the pixels). In the preferred embodiment of the present invention, the image I' together with the binary mask of a particle are used to compute the following densitometric features.

1. Volume

This is computed from the set of gray pixels in I' that correspond to the binary mask of the particle. It is defined as the sum of these gray values.

2. Mean Gray Value

This is computed from the set of gray pixels in I' that correspond to the binary mask of the particle. It is defined as the mean of these gray values.

3. Dynamics

This is defined to be the dynamics value of the regional minimum associated with the particle (the value determined during segmentation).

Texture Features

These features characterize the gray-level (optical density or intensity) variation of the pixels in a gray-level image object, taking into account the position of the pixels. In the preferred embodiment of the present invention, the image I' together with the binary mask of a particle are used to compute the following texture feature:

1. Surface Area

This is computed from the set of gray pixels in the discrete morphological gradient of I' that correspond to the binary mask of the particle. It is defined as the sum of these gray values [Rivest & Soille; Physical significance of image measurements; IEEE Transactions on instrumentation and Measurement; vol. 44; no. 3; June 1995; pp. 751-754].

Contextual Features

These features characterize relationships between one or more image objects. In the preferred embodiment of the present invention, relationships between a nucleus and its particles, and relationships between the particles themselves are characterized. With respect to the first case the following feature is computed:

1. Distance to Nucleus Boundary

This is computed from the set of gray pixels in the Euclidean distance transform [Mehnert & Jackway; On computing the exact Euclidean distance transform on rectangular and hexagonal grids; Journal of Mathematical Imaging and Vision; vol. 11; 1999; pp. 223-230] of the binary mask of the nucleus that correspond to the binary mask of the particle. It is defined as the mean of these gray values.

Figure 11:
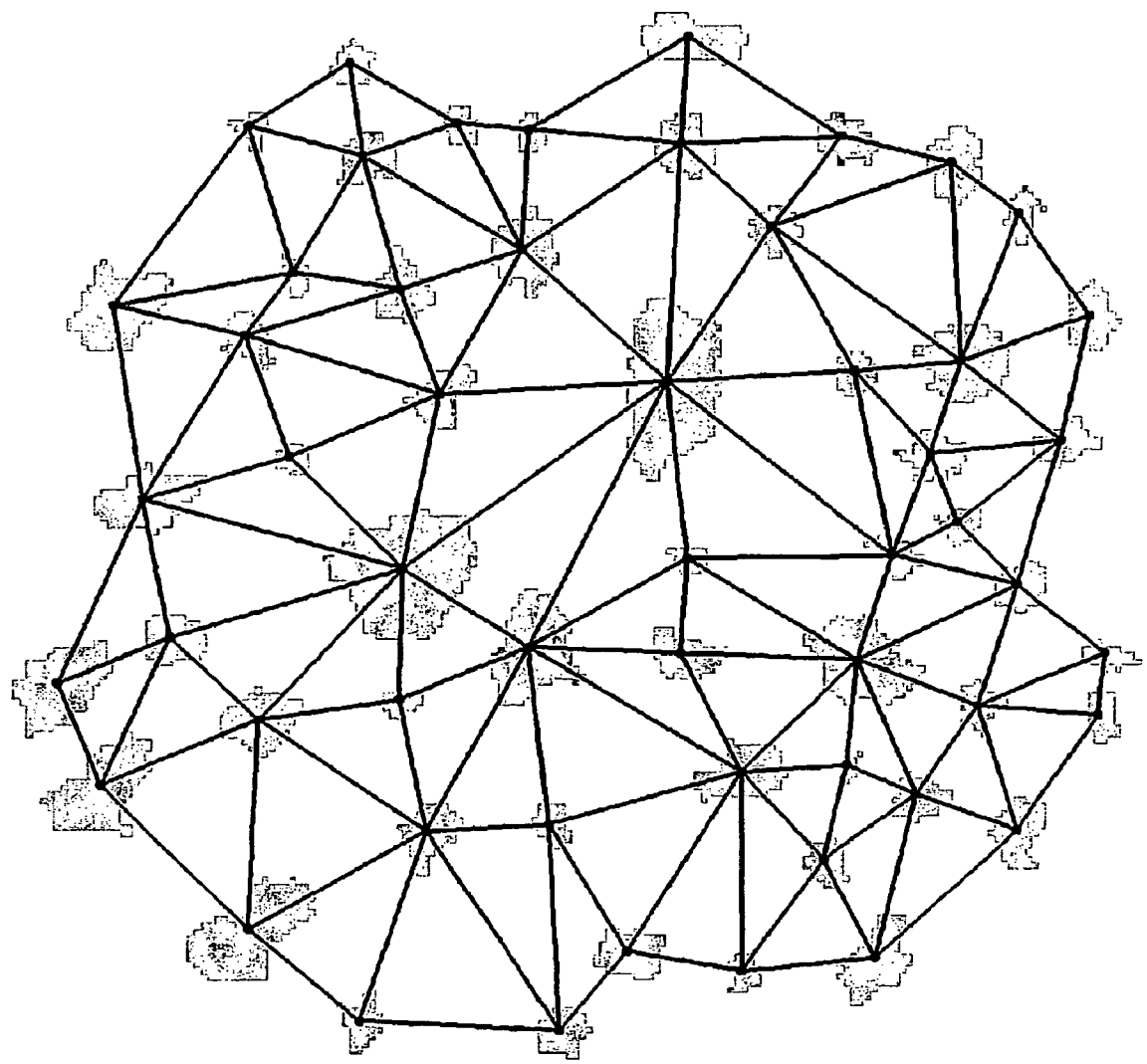
FIG. 11 shows a Delaunay graph for the dark particles of FIG. 10.

With respect to the second case, contextual features are computed from (i) a neighborhood graph defined on the dark particles; (ii) a neighborhood graph defined on the light particles; and (iii) a neighborhood graph defined on both the light and dark particles. Vincent [Graphs and mathematical morphology; Signal Processing; vol. 16; 1989; pp. 365-388] describes and presents algorithms for a range of such neighborhood graphs. The preferred type of neighborhood graph is the Delaunay graph. The Delaunay graph for the dark particles of FIG. 10 is shown in FIG. 11. In the preferred embodiment of the invention, the following graph-based features are computed for particles:

2. Number of Dark Particle Neighbors a Dark Particle Has

This is determined from the neighborhood graph defined on the dark particles; e.g. it can be seen in FIG. 11 that the dark particle shown as a binary mask in FIG. 10 has 9 dark particle neighbors.

3. Mean Distance Between a Dark Particle and its Dark Particle Neighbors

This is determined from the neighborhood graph defined on the dark particles. The distance is the centroid-to-centroid Euclidean distance; e.g. this distance is the length of a graph edge connecting 2 particles in FIG. 11.

4. Number of Light Particle Neighbors a Light Particle Has

This is determined from the neighborhood graph defined on the light particles.

5. Mean Distance Between a Light Particle and its Light Particle Neighbors

This is determined from the neighborhood graph defined on the light particles. The distance is the centroid-to-centroid Euclidean distance.

6. Number of Dark Particle Neighbors

This is determined from the neighborhood graph defined on both the light and dark particles.

7. Mean Distance to Dark Particles

This is determined from the neighborhood graph defined on both the light and dark particles. The distance is the centroid-to-centroid Euclidean distance.

8. Number of Light Particle Neighbors

This is determined from the neighborhood graph defined on both the light and dark particles.

9. Mean Distance to Light Particles

This is determined from the neighborhood graph defined on both the light and dark particles. The distance is the centroid-to-centroid Euclidean distance.

10. Number of Particle Neighbors

This is determined from the neighborhood graph defined on both the light and dark particles.

11. Mean Distance to Particle Neighbors

This is determined from the neighborhood graph defined on both the light and dark particles. The distance is the centroid-to-centroid Euclidean distance.

Nucleus Features

The particles segmented from a nucleus can be used to compute a variety of nucleus features. One set of such features is obtained from summary statistics (including moments and order statistics) computed for each particle feature; e.g. mean, median, mode, variance, interquartile range, skewness, and kurtosis of particle area. These summary statistics can be computed for the dark particles only, the light particles only, and for both types of particle. In the preferred embodiment of the present invention, the following features are computed:

1. mean of each particle feature except dynamics;
2. standard deviation of each particle feature except dynamics;
3. median dynamics;
4. interquartile range of dynamics;
5. number of dark particles; and
6. number of light particles.

Another set of nucleus features can be computed from (i) the histogram of gray-values in the distance transform of the binary mask representing the nucleus background between the dark particles (see FIG. 10); (ii) the histogram of gray-values in the distance transform of the binary mask representing the nucleus background between the light particles; and (iii) the histogram of gray-values in the distance transform of the binary mask representing the nucleus background between both the light and dark particles. Summary statistics of these histograms yield nucleus features. Alternatively, the method of Russ [The image processing handbook; Florida; CRC Press; ISBN 0849342333; 1992; p. 336] can be used to compute a feature for each histogram that characterizes the particle clustering. In the preferred embodiment of the invention, the following features are computed:

7. mean of the histogram obtained from the Euclidean distance transform of the nucleus background between the dark particles;
8. standard deviation of the histogram obtained from the Euclidean distance transform of the nucleus background between the dark particles;
9. mean of the histogram obtained from the Euclidean distance transform of the nucleus background between the light particles;
10. standard deviation of the histogram obtained from the Euclidean distance transform of the nucleus background between the light particles;
11. mean of the histogram obtained from the Euclidean distance transform of the nucleus background between both the light and dark particles; and
12. standard deviation of the histogram obtained from the Euclidean distance transform of the nucleus background between both the light and dark particles.

Several additional sets of nucleus features can be computed from the 3 neighborhood graphs aforementioned (one defined on the dark particles only, one defined on the light particles only, and one defined on both the light and dark particles). For a given graph, a co-occurrence matrix can be defined for each particle feature as described in [Toriwaki & Yokoi; Voronoi and related neighbors on digitized two-dimensional space with applications to texture analysis; in Computational morphology: A computational geometric approach to the analysis of form; Toussaint (Ed.); Elsevier Science Publishers; Amsterdam; ISBN: 0444704671; 1988; pp. 207-228]. For example, from the histogram of dark particle areas and the neighborhood graph defined on these particles, it is possible to construct a matrix such that the entry in the i-th row and the j-th column represents the number of times a particle of area i is adjacent to a particle of area j. To keep the matrix size manageable or to avoid having a sparse matrix the number of bins in the histogram of the feature under consideration can be reduced. For each co-occurrence matrix, co-occurrence matrix features can be computed and used as nucleus features. A compendium of co-occurrence matrix features can be found in [Walker; Adaptive multi-scale texture analysis: with application to automated cytology; PhD Thesis; School of Computer Science and Electrical Engineering; The University of Queensland; Australia; 1997; Chapter 2]. In the preferred embodiment of the invention the following features are computed:

13. contrast and
14. energy computed from the co-occurrence matrix obtained from the neighborhood graph defined on the dark particles, using the particle feature area. To keep the matrix manageable, the feature area is binned into two classes: (i) small containing particles with an area less than ⅙ of the nucleus area and (ii) large containing all other particles.

Slide Features Derived From Nucleus Features

Figure 12:
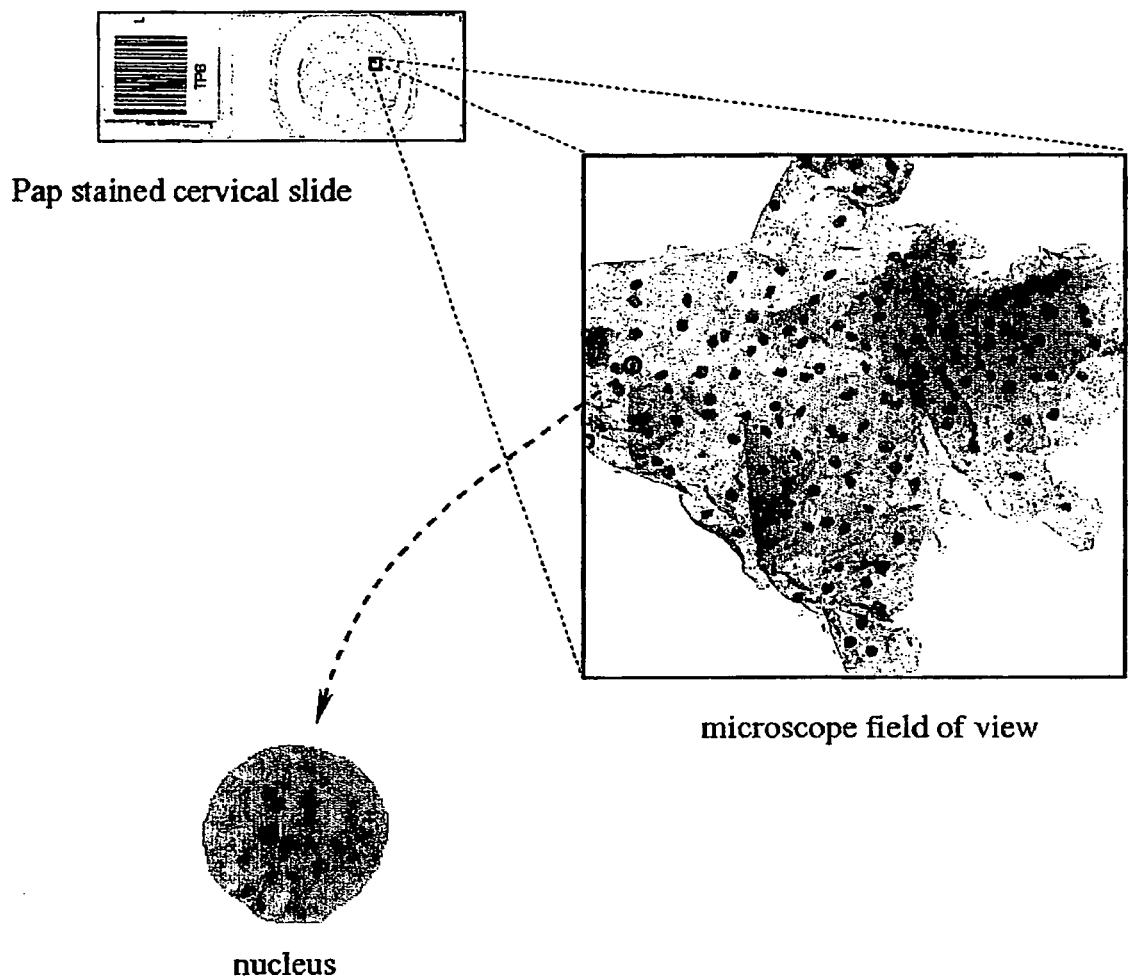
FIG. 12 shows a cytology slide, a magnified image of a particular field on the slide, and a magnified image of one of the nuclei from this field of view.

FIG. 12 (not to scale) shows a cytology slide, an image of a single field of view from the slide taken by a CCD camera mounted on a microscope, and one of the nuclei from the field of view. Features can be synthesized for a slide (be it a cytology slide or a histology slide) by computing summary statistics (including moments and order statistics) for each feature for all or a subset of nuclei obtained from the slide. In the preferred embodiment of the invention the mean and standard deviation are computed for each nucleus feature from a statistically representative number of nuclei extracted from a slide.

Slide Features Derived From Particle Features

Slide features can also be synthesized by computing summary statistics (including moments and order statistics) directly from particle features computed for all or a subset of nuclei extracted from a slide. In the preferred embodiment of the invention the mean and standard deviation are computed for each particle feature from a statistically representative number of nuclei extracted from a slide.

A person skilled in the relevant art may realize possible variations to the described process that will nonetheless fall within the scope of this invention. One such variation is to use different estimators than those described to compute features such as perimeter, e.g. particle perimeter could be computed using the method described in the aforementioned patent of Palcic et al. for computing the perimeter of a nucleus. Another variation is to employ a different type of neighborhood graph (e.g. a Gabriel graph) for the purpose of computing features. Another variation is to compute graph-based features using k-adjacency rather than just 1-adjacency; i.e. 2 particles are considered to be k-neighbors if a sequence of k edges connects them in the neighborhood graph. Another variation is that a region adjacency graph can be defined on the zones of influence image Z, computed during segmentation, and that this be used in place of the neighborhood graph for the purpose of computing features. Another variation is that nucleus features can be computed from the set of lengths of shared borders between pairs of zones of influence. Another variation is that nucleus features can be computed from the histogram of centroid-to-centroid distances for pairs of neighboring particles (as defined by a neighborhood graph). Another variation is that the segmentation of the nucleus into dark particles and light particles creates a partition of the nucleus pixels into 3 sets and that these 3 sets can be used to compute some of the features that Young, Verbeek, and Mayall compute for their method of chromatin segmentation described earlier (note that the exact meaning and value of these will be completely different for the present invention). Another variation is that nucleus features can be computed from histograms of particle features for particles that are adjacent to the nucleus boundary. Another variation is to compute particle features directly from the nucleus image I rather than I' (in which case the particle masks must be down-sampled or the image I up-sampled). Another variation is that features can be normalized; e.g. particle area can be expressed as a percentage of the nucleus area. Another variation is that distances other than Euclidean distance can be used to compute features; e.g. chessboard distance, city-block distance, 5-7-chamfer distance [Heijmans; Morphological image operators; Academic Press; San Diego; ISBN: 0-12-014599-5; 1994; pp. 325-331].

It is an intention of the inventors that the features computed using the present invention be used in a computerized system (an automated cytometer and classifier) for the purpose of detecting neoplasia and malignancy associated changes in cells and tissue.

EXAMPLE

Figure 13:
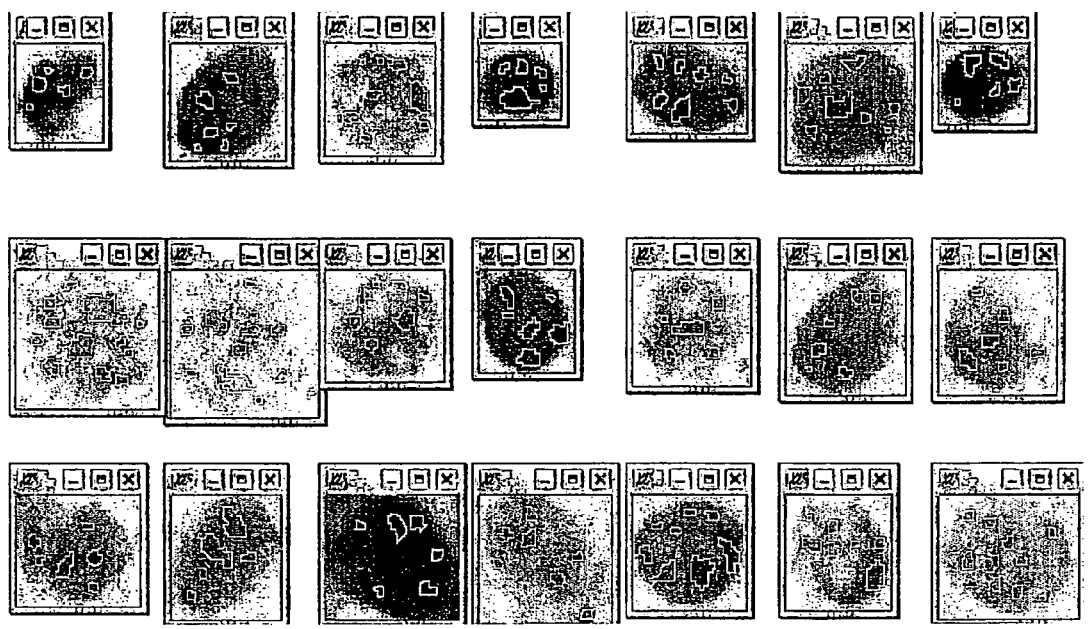
FIG. 13 shows a small gallery of nuclei for which the dark particles have been segmented.

The present invention has been applied to hundreds of thousands of images of cell nuclei, or objects that resemble nuclei, obtained from 148 cytology slides using an automated cytometer. FIG. 13 shows a small gallery of nuclei for which the dark particles have been segmented by the invention. Each slide was prepared from a cervical swab taken from a patient. The set of slides include only one slide per patient. The slides were prepared using a liquid-based preparation technique, and stained using the Papanicolaou staining protocol. Each slide has been classified by a pathologist as either negative (showing no signs of cervical intraepithelial neoplasia (CIN)), or positive (showing signs of CIN). In the latter case the pathologist has indicated the relative degree of abnormality: CIN 1, CIN 2, or CIN 3. Of the 148 slides, 101 are negative. The methods used by the cytometer to obtain the images of nuclei, or objects resembling nuclei, are documented in PCT Patent Application number PCT/AU01/00787 and PCT Patent Application number PCT/AU99/00231.

The cytometer was programmed to extract images of at most 10000 objects resembling nuclei (in terms of size, shape, and intensity) from each slide. A large number of objects found by the cytometer are artifacts such as blood, mucous, dust, poorly segmented nuclei, and out-of-focus images of nuclei. The invention was used to perform artifact rejection as follows. All objects that contained fewer than 5 dark particles, or that contained very large dark particles (>⅓ of the area of the nucleus) were considered to be artifacts and rejected (too few dark particles, or extremely large dark particles, is indicative of poorly segmented or poorly focused nuclei, or an image artifact such as dust, blood, or mucous).

The following features were computed and recorded for each nucleus:

(Note: sdev means standard deviation in the following tables)

| Derived directly from the binary mask of the nucleus |
| --- |
| nucleus_area |
| nucleus_perimeter |

| Derived from the invention |
| --- |
| nucleus_mean_dark_particle_area |
| nucleus_sdev_dark_particle_area |
| nucleus_mean_dark_particle_perimeter |
| nucleus_sdev_dark_particle_perimeter |
| nucleus_median_dark_particle_dynamics |
| nucleus_IQR_dark_particle_dynamics |
| nucleus_mean_dark_particle_distance_to_nucleus_boundary |
| nucleus_sdev_dark_particle_distance_to_nucleus_boundary |
| nucleus_total_dark_particle_area |
| nucleus_number_of_dark_particles |
| ratio_of_total_dark_particle_area_to_nucleus_area |

Means and standard deviations of these nucleus features yielded the following slide features:

| Slide features derived from nucleus features |
| --- |
| slide_mean_of_nucleus_area |
| slide_sdev_of_nucleus_area |
| slide_mean_of_nucleus_perimeter |
| slide_sdev_of_nucleus_perimeter |
| slide_mean_of_nucleus_mean_dark_particle_area |
| slide_sdev_of_nucleus_mean_dark_particle_area |
| slide_mean_of_nucleus_sdev_dark_particle_area |
| slide_sdev_of_nucleus_sdev_dark_particle_area |
| slide_mean_of_nucleus_mean_dark_particle_perimeter |
| slide_sdev_of_nucleus_mean_dark_particle_perimeter |
| slide_mean_of_nucleus_sdev_dark_particle_perimeter |
| slide_sdev_of_nucleus_sdev_dark_particle_perimeter |
| slide_mean_of_nucleus_median_dark_particle_dynamics |
| slide_sdev_of_nucleus_median_dark_particle_dynamics |
| slide_mean_of_nucleus_IQR_dark_particle_dynamics |
| slide_sdev_of_nucleus_IQR_dark_particle_dynamics |
| slide_mean_of_nucleus_mean_dark_particle_distance_to_nucleus_boundary |
| slide_sdev_of_nucleus_mean_dark_particle_distance_to_nucleus_boundary |
| slide_mean_of_nucleus_sdev_dark_particle_distance_to_nucleus_boundary |
| slide_sdev_of_nucleus_sdev_dark_particle_distance_to_nucleus_boundary |
| slide_mean_of_nucleus_total_dark_particle_area |
| slide_sdev_of_nucleus_total_dark_particle_area |
| slide_mean_of_nucleus_number_of_dark_particles |
| slide_sdev_of_nucleus_number_of_dark_particles |
| slide_mean_of_ratio_of_total_dark_particle_area_to_nucleus_area |
| slide_sdev_of_ratio_of_total_dark_particle_area_to_nucleus_area |

These 26 slide features, along with the pathologist classifications of negative and positive, were used to train and test a 2-class statistical classifier with the R statistical analysis software [R is free software available from the GNU project web site]. The training phase included feature selection (i.e. determining which features are useful for discriminating between the 2 classes). The training was done on a subset of the feature data made up of 70% of the negatives and 70% of the positives chosen at random. The remaining positives and negatives were used to test the classifier. The performance of the classifier was recorded in terms of the area under the receiver operating characteristic (ROC) curve. A classifier for which the area under the ROC curve (AUC) is 0.5 classifies randomly. A classifier for which the AUC is 1 is a perfect classifier. The train/test procedure was independently repeated 100 times (each time randomly splitting the positives and the negatives in the ratio 7:3 for the training and testing data respectively). From the 100 different trials, the following 7 features were selected more than 70% of the time:

1. slide_mean_of_nucleus_number_of_dark_particles
2. slide_mean_of_nucleus_perimeter
3. slide_mean_of_nucleus_mean_dark_particle_area
4. slide_sdev_of_nucleus_mean_dark_particle_area
5. slide_sdev_of_nucleus_sdev_dark_particle_area
6. slide_sdev_of_nucleus_mean_dark_particle_ distance_to_nucleus_boundary
7. slide_sdev_of_nucleus_sdev_dark_particle_ distance_to_nucleus_boundary From another 100 trials with only the 7 features above, the following 4 features were selected more than 75% of the time:

1. slide_mean_of_nucleus_number_of_dark_particles
2. slide_mean_of_nucleus_perimeter
3. slide_mean_of_nucleus_mean_dark_particle_area
4. slide_sdev_of_nucleus_mean_dark_particle_ distance_to_nucleus_boundary With these 4 features the following estimate of the area under the ROC curve was obtained:

78%±0.06 (mean±standard deviation)

This indicates that features that summarize the size and distance to the nuclear boundary of the dark particles (condensed chromatin) in the nucleus are good features for detecting MACs. Moreover these features correspond well to descriptive terms like clumping and margination used by cytologists to describe chromatin texture.

Throughout the preceding specification the aim has been to describe the preferred embodiment of the present invention without limiting the invention to any one embodiment.

The invention claimed is:

1. A computer program product, comprising a computer usable medium having a computer readable program code embodied therein, said computer readable program code adapted to be executed to implement a method of segmenting chromatin particles in the nucleus of a cell, the method comprising:
   (i) locating regional minima in an image;
   (ii) computing a zone of influence (ZOI) around each regional minimum;
   (iii) taking the union of the regional minima and the boundaries of the ZOIs to form a set of markers/seeds;
   (iv) segmenting a single chromatin blob within each ZOI by applying a region growing procedure initiated from the set of markers/seeds; and
   (v) computing a feature set representing the segmented chromatin particles, wherein the feature set is displayed to a user.

2. The computer program product of claim 1 wherein the image is a two-dimensional gray-scale image comprising only those pixels that define the nucleus of a cell.

3. The computer program product of claim 1 wherein the image is a three-dimensional image.

4. The computer program product of claim 1 wherein the image is a multi-valued image.

5. The computer program product of claim 1 wherein the method further comprises evaluating the contrast of each regional minimum and discarding those regional minima that do not satisfy a priori specified contrast criteria.

6. The computer program product of claim 1 wherein the method further comprises a preliminary step of pre-processing the image to correct for degradations.

7. The computer program product of claim 6 wherein the pre-processing step removes degradations such as noise and blurring.

8. The computer program product of claim 6 wherein the pre-processed image is up-sampled.

9. The computer program product of claim 1 wherein the regional minima are regions of constant gray-value that are surrounded by pixels of strictly higher (lighter) gray-value, to identify dark blobs.

10. The computer program product of claim 1 wherein the step of computing a zone of influence is performed by means of region growing or the computation of influence zones (IZs).

11. The computer program product of claim 1 wherein the segmentation step is performed by means of one of a watershed transform or a seeded region growing algorithm.

12. A computer program product, comprising a computer usable medium having a computer readable program code embodied therein, said computer readable program code adapted to be executed to implement a method of quantitatively characterizing the distribution of nuclear chromatin, the method comprising:
   (i) obtaining an image of a cell nucleus showing chromatin texture;
   (ii) locating regional minima in the image;
   (iii) computing a zone of influence (ZOI) around each regional minimum;
   (iv) taking the union of the regional minima and the boundaries of the ZOIs to form a set of markers/seeds;
   (v) segmenting a single chromatin blob within each ZOI by applying a region growing procedure initiated from the set of markers/seeds; and
   (vi) computing a feature set characterizing the distribution of chromatin, wherein the feature set is displayed to a user.

13. The computer program product of claim 12 wherein the method further comprises synthesizing chromatin texture features from the features computed for individual chromatin blob features.

14. The computer program product of claim 13 wherein the method further comprises repeating steps (ii) to (v) for the negative of the image of step (i) and using the computed features in step (vi).

15. The computer program product of claim 12 wherein the method further comprises evaluating the contrast of each regional minimum in the image of the cell nucleus and discarding those regional minima that do not satisfy a priori specified contrast criteria.

16. The computer program product of claim 12 wherein the image of the cell nucleus is a gray-scale image.

17. The computer program product of claim 12 wherein the computed features are selected from morphometric features, densitometric features, texture features, and contextual features.

18. The computer program product of claim 17 wherein the morphometric features include one or more of: area; perimeter; and G factor.

19. The computer program product of claim 17 wherein the densitometric features include one or more of: volume; mean gray value; and dynamics.

20. The computer program product of claim 17 wherein the contextual features include one or more of: distance to nucleus boundary; number of dark particle neighbors a dark particle has; mean distance between a dark particle and its dark particle neighbors; number of light particle neighbors a light particle has; mean distance between a light particle and its light particle neighbors; number of dark particle neighbors; mean distance to dark particles; number of light particle neighbors; mean distance to light particles; number of particle neighbors; and mean distance to particle neighbors.

21. The computer program product of claim 13 wherein the synthesized features are selected from nucleus features, slide features derived from nucleus features, and slide features derived from particle features.

22. The computer program product of claim 21 wherein the nucleus features include one or more of: mean of each particle feature except dynamics; standard deviation of each particle feature except dynamics; median dynamics; interquartile range of dynamics; number of dark particles; number of light particles; mean of the histogram obtained from the Euclidean distance transform of the nucleus background between the dark particles; standard deviation of the histogram obtained from the Euclidean distance transform of the nucleus background between the dark particles; mean of the histogram obtained from the Euclidean distance transform of the nucleus background between the light particles; standard deviation of the histogram obtained from the Euclidean distance transform of the nucleus background between the light particles; mean of the histogram obtained from the Euclidean distance transform of the nucleus background between both the light and dark particles; standard deviation of the histogram obtained from the Euclidean distance transform of the nucleus background between both the light and dark particles; contrast; and energy computed from the co-occurrence matrix obtained from the neighborhood graph defined on the dark particles, using the particle feature area.

23. The computer program product of claim 1 further comprising:

(vi) determining the existence of neoplasia and malignancy associated changes in the cell using the segmented chromatin particles.

24. The computer program product of claim 1, comprising an automated cytometer and classifier.

* * * * *